United States Patent
Zhou et al.

(10) Patent No.: US 10,998,955 B2
(45) Date of Patent: May 4, 2021

(54) GROUP-BASED BEAM INDICATION AND SIGNALING

(71) Applicant: QUALCOMM Incorporated, San Diego, CA (US)

(72) Inventors: Yan Zhou, San Diego, CA (US); Tao Luo, San Diego, CA (US); Kiran Venugopal, Raritan, NJ (US); Tianyang Bai, Bridgewater, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/802,021

(22) Filed: Feb. 26, 2020

(65) Prior Publication Data
US 2020/0287610 A1    Sep. 10, 2020

Related U.S. Application Data

(60) Provisional application No. 62/814,621, filed on Mar. 6, 2019.

(51) Int. Cl.
*H04B 7/06* (2006.01)
*H04W 72/04* (2009.01)
(Continued)

(52) U.S. Cl.
CPC .......... *H04B 7/0695* (2013.01); *H04L 5/0092* (2013.01); *H04W 72/042* (2013.01);
(Continued)

(58) Field of Classification Search
CPC ....... H04L 5/001; H04L 5/0053; H04W 52/34
See application file for complete search history.

(56) References Cited

U.S. PATENT DOCUMENTS

| 10,506,588 B2 * | 12/2019 | Kim ........................ H04L 5/00 |
| 10,560,851 B2 * | 2/2020 | Guo ..................... H04B 7/0695 |
| 2019/0075014 A1 * | 3/2019 | Zhou .................. H04W 72/042 |

FOREIGN PATENT DOCUMENTS

WO     2018232090 A1     12/2018

OTHER PUBLICATIONS

Ericsson: "Enhancements to Multi-Beam Operation", 3GPP Draft; R1-1902529, Enhancements to Multi-Beam Operation, 3rd Generation Partnership Project (3GPP), Mobile Competence Centre; 650, Route Des Lucioles; F-06921 Sophia-Antipolis Cedex; France, vol. RAN WG1, No. Athens. Greece; Feb. 25, 2019-Mar. 1, 2019, Feb. 15, 2019 (Feb. 15, 2019), XP051600225, 15 pages, Retrieved from the Internet: URL: http://www.3gpp.org/ftp/tsg%5Fran/WG1%5FRL1/TSGR1%5F96/Docs/R1%2D1902529%2Ezip [retrieved on Feb. 15, 2019].

(Continued)

*Primary Examiner* — Chandrahas B Patel
(74) *Attorney, Agent, or Firm* — Qualcomm IP Dept.; James Hunt Yancey, Jr.

(57) ABSTRACT

Various aspects of the present disclosure generally relate to wireless communication. In some aspects, a user equipment (UE) may receive a downlink beam indication for at least one of a channel, a resource, a resource set, a bandwidth part, or a component carrier; and use the downlink beam indication for a group of channels, resources, resource sets, bandwidth parts, or component carriers. In some aspects, a UE may receive an indication of a spatial relation and multiple physical uplink control channel (PUCCH) resources to which the spatial relation is to be applied; and use the spatial relation to transmit on one or more PUCCH resources of the multiple PUCCH resources. Numerous other aspects are provided.

33 Claims, 7 Drawing Sheets

(51) Int. Cl.
  *H04W 80/02*   (2009.01)
  *H04L 5/00*    (2006.01)
(52) U.S. Cl.
  CPC ..... *H04W 72/046* (2013.01); *H04W 72/0413* (2013.01); *H04W 80/02* (2013.01)

(56) References Cited

OTHER PUBLICATIONS

Ericsson: "Remaining Issues on Beam Measurement and Reporting", 3GPP TSG-RAN WG1 Meeting #93, 3GPP Draft; R1-1806217 Remaining Issues for Beam Measurement and Reporting, 3rd Generation Partnership Project (3GPP), Mobile Competence Centre; 650, Route Des Lucioles; F-06921 Sophia-Antipolis Cedex, vol. RAN WG1, No. Busan, Korea; May 21, 2018-May 25, 2018, May 20, 2018 (May 20, 2018), pp. 1-13, XP051441426, Retrieved from the Internet: URL: http://www.3gpp.org/ftp/Meetings%5F3GPP%5FSYNC/RAN1/Docs/ [retrieved on May 20, 2018] paragraph [2.2.1].
International Search Report and Written Opinion—PCT/US2020/020113—ISA/EPO—dated May 26, 2020.
Nokia et al: "MAC CEs Definition for NR MIMO", 3GPP Draft; R2-1802612, MAC CEs Definition for NR MIMO, 3rd Generation Partnership Project (3GPP), Mobile Competence Centre; 650, Route Des Lucioles; F-06921 Sophia-Antipolis Cedex; France, vol. RAN WG2 No. Athens, Greece; Feb. 26, 2018-Mar. 2, 2018 Feb. 16, 2018 (Feb. 16, 2018), XP051400211, 9 pages, Retrieved from the Internet: URL: http://www.3gpp.org/ftp/tsg%5Fran/WG2%5FRL2/TSGR2%5F101/Docs/ [retrieved on Feb. 16, 2018].

* cited by examiner

GROUP-BASED BEAM INDICATION AND SIGNALING

CROSS-REFERENCE TO RELATED APPLICATION

This patent application claims priority to U.S. Provisional Patent Application No. 62/814,621, filed on Mar. 6, 2019, entitled "GROUP-BASED BEAM INDICATION AND SIGNALING," and assigned to the assignee hereof. The disclosure of the prior application is considered part of and is incorporated by reference in this patent application as if fully set forth below in its entirety and for all applicable purposes.

TECHNICAL FIELD

Aspects of the technology described below generally relate to wireless communication and to techniques and apparatuses for group-based beam indication and signaling. Some techniques and apparatuses described herein enable and provide wireless communication devices and systems configured to reduce network resource overhead, increase signaling flexibility, and/or conserve energy resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include receiving a beam indication (e.g., for a downlink beam and/or for an uplink beam) for at least one of a channel, a resource, a resource set, a bandwidth part, or a component carrier; and using the beam indication for a group of channels, resources, resource sets, bandwidth parts, or component carriers. According to one specific, non-limiting example deployment aspect, a single activated and/or configured beam indication used on a particular uplink and/or downlink channel or resource on a bandwidth part and/or a component carrier can be applied to a group of channels, resources, resource sets, bandwidth parts, and/or component carriers.

In some aspects, a method of wireless communication, performed by a UE, may include receiving an indication of a spatial relation and multiple physical uplink control channel (PUCCH) resources to which the spatial relation is to be applied; and using the spatial relation to transmit on one or more PUCCH resources of the multiple PUCCH resources.

In some aspects, a UE for wireless communication may include memory and one or more processors operatively coupled to the memory. The memory and the one or more processors may be configured to receive a beam indication (e.g., for a downlink beam and/or for an uplink beam) for at least one of a channel, a resource, a resource set, a bandwidth part, or a component carrier; and use the beam indication for a group of channels, resources, resource sets, bandwidth parts, or component carriers. According to one specific, non-limiting example deployment aspect, a single activated and/or configured beam indication used on a particular uplink and/or downlink channel or resource on a bandwidth part and/or a component carrier can be applied to a group of channels, resources, resource sets, bandwidth parts, and/or component carriers.

In some aspects, a UE for wireless communication may include memory and one or more processors operatively coupled to the memory. The memory and the one or more processors may be configured to receive an indication of a spatial relation and multiple PUCCH resources to which the spatial relation is to be applied; and use the spatial relation to transmit on one or more PUCCH resources of the multiple PUCCH resources.

In some aspects, a non-transitory computer-readable medium may store one or more instructions for wireless communication. The one or more instructions, when executed by one or more processors of a UE, may cause the one or more processors to: receive a beam indication (e.g., for a downlink beam and/or for an uplink beam) for at least one of a channel, a resource, a resource set, a bandwidth part, or a component carrier; and use the beam indication for a group of channels, resources, resource sets, bandwidth parts, or component carriers. According to one specific, non-limiting example deployment aspect, a single activated and/or configured beam indication used on a particular uplink and/or downlink channel or resource on a bandwidth part and/or a component carrier can be applied to a group of channels, resources, resource sets, bandwidth parts, and/or component carriers.

In some aspects, a non-transitory computer-readable medium may store one or more instructions for wireless communication. The one or more instructions, when executed by one or more processors of a UE, may cause the one or more processors to: receive an indication of a spatial relation and multiple PUCCH resources to which the spatial relation is to be applied; and use the spatial relation to transmit on one or more PUCCH resources of the multiple PUCCH resources.

In some aspects, an apparatus for wireless communication may include means for receiving a beam indication (e.g., for a downlink beam and/or for an uplink beam) for at least one of a channel, a resource, a resource set, a bandwidth part, or a component carrier; and means for using the beam indication for a group of channels, resources, resource sets, bandwidth parts, or component carriers. According to one specific, non-limiting example deployment aspect, a single activated and/or configured beam indication used on a particular uplink and/or downlink channel or resource on a bandwidth part and/or a component carrier can be applied to a group of channels, resources, resource sets, bandwidth parts, and/or component carriers.

In some aspects, an apparatus for wireless communication may include means for receiving an indication of a spatial relation and multiple PUCCH resources to which the spatial relation is to be applied; and means for using the spatial relation to transmit on one or more PUCCH resources of the multiple PUCCH resources.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
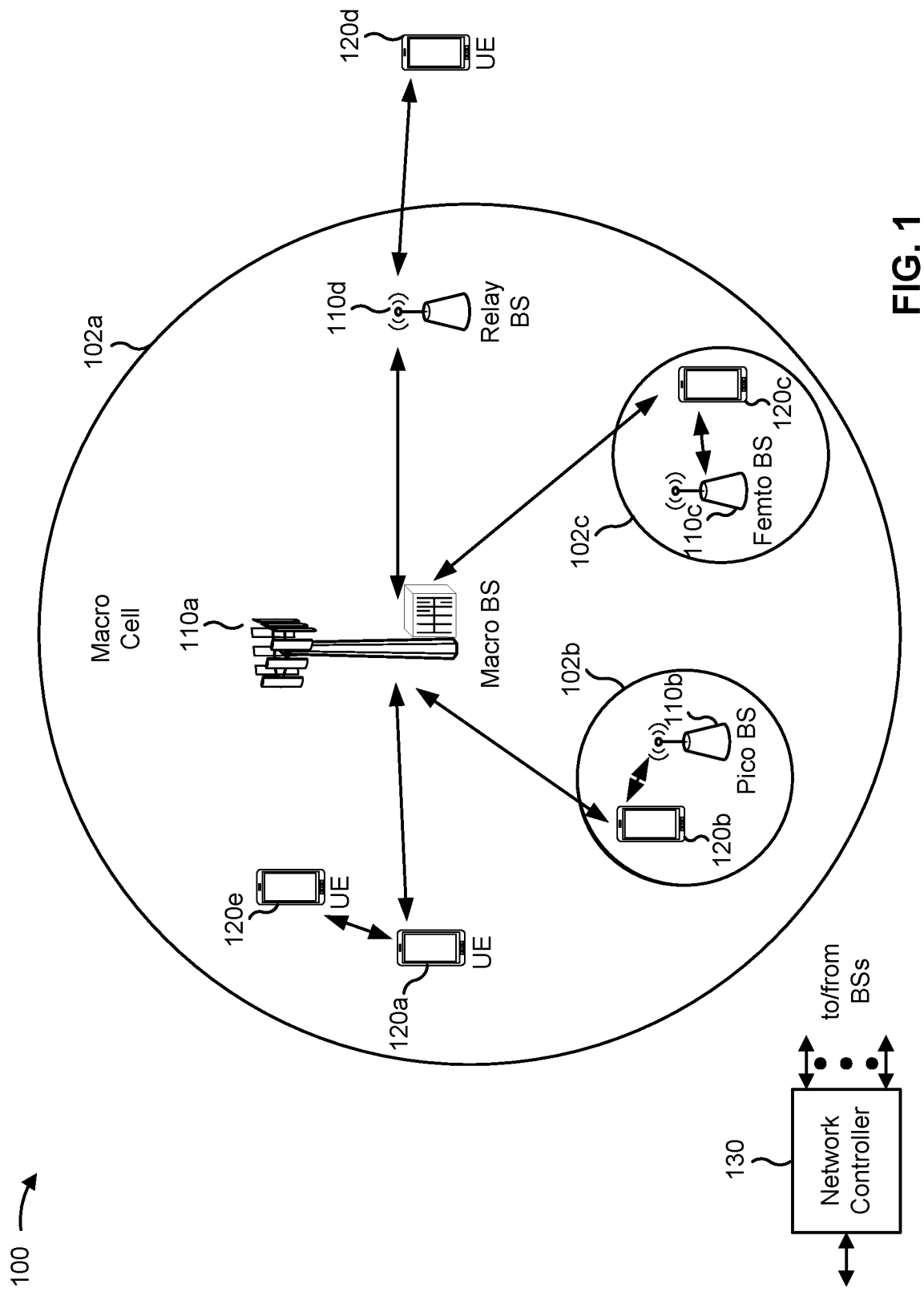
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. In some deployments, a BS may be known as a scheduling entity (e.g., in that the BS can schedule communications of other devices). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for areas of varying sizes or ranges. BSs can be configured to enable communication in a variety of cell arrangements, including a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary. A cell that is mobile enables a geographic area of the cell to move according to the location of a mobile BS. In some aspects, a UE can be configured to carry out BS functionality. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicle, a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. Further, in some deployments, UEs may be referred to as scheduled entities (e.g., in that UE communication may be scheduled by another entity (e.g., a BS or another scheduling entity).

In general, any number of wireless networks may be deployed in a given geographic area. That is, multiple wireless networks can exist and can be deployed simultaneously in a given area. Some devices can be multi-mode devices and can be configured to communicate with multiple networks. In some deployments, devices may operate with only one network, with only a limited number of networks, and/or with only a particular type of network (e.g., a 5G stand-alone device). Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
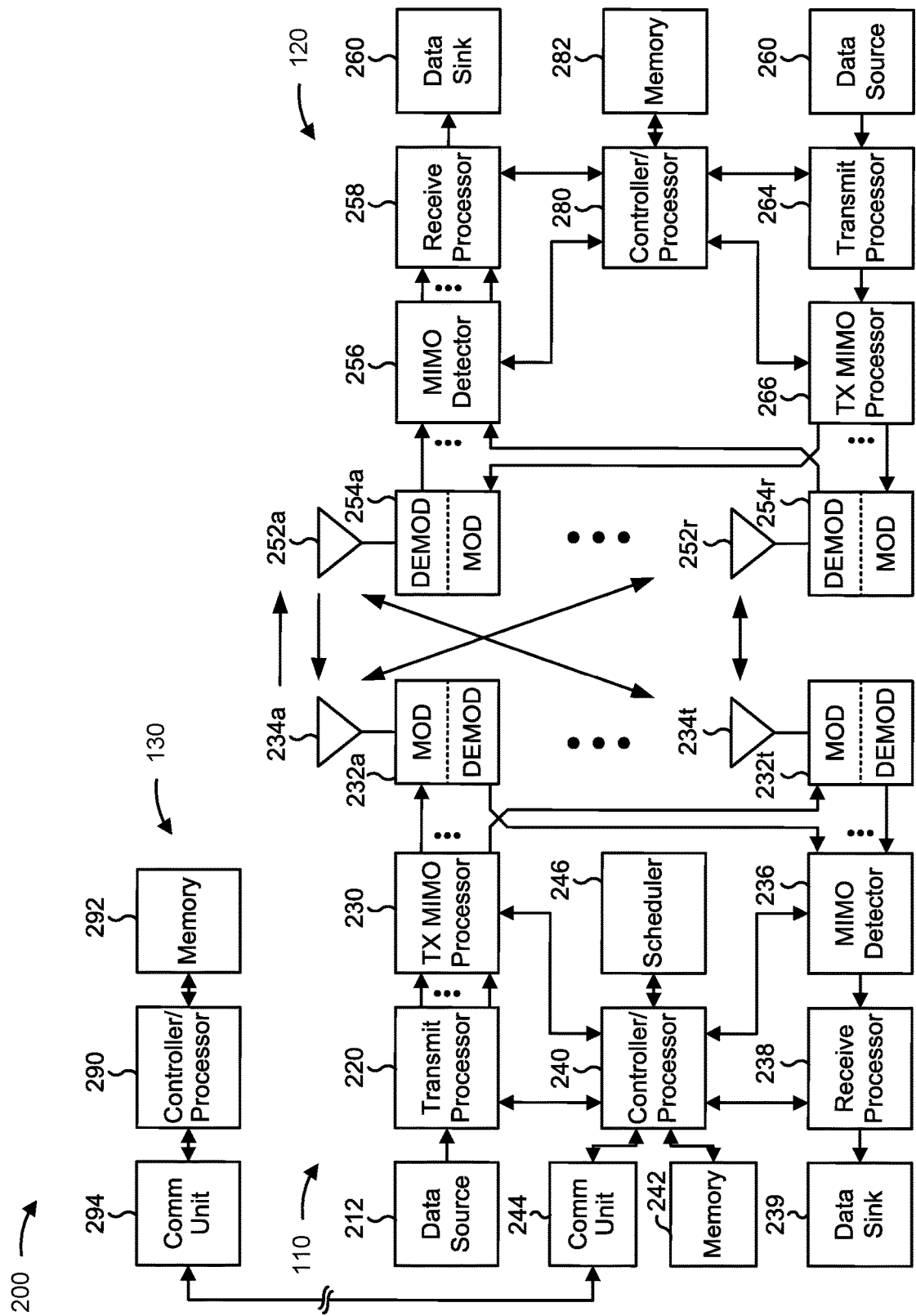
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with group-based beam indication and signaling, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a downlink beam indication for at least one of a channel, a resource, a resource set, a bandwidth part, or a component carrier; means for using the downlink beam indication for a group of channels, resources, resource sets, bandwidth parts, or component carriers; and/or the like. Additionally, or alternatively, UE 120 may include means for receiving an indication of a spatial relation and multiple PUCCH resources to which the spatial relation is to be applied; means for using the spatial relation to transmit on one or more PUCCH resources of the multiple PUCCH resources;

and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided merely as an example. Other examples may differ from what is described with regard to FIG. 2.

Figure 3:
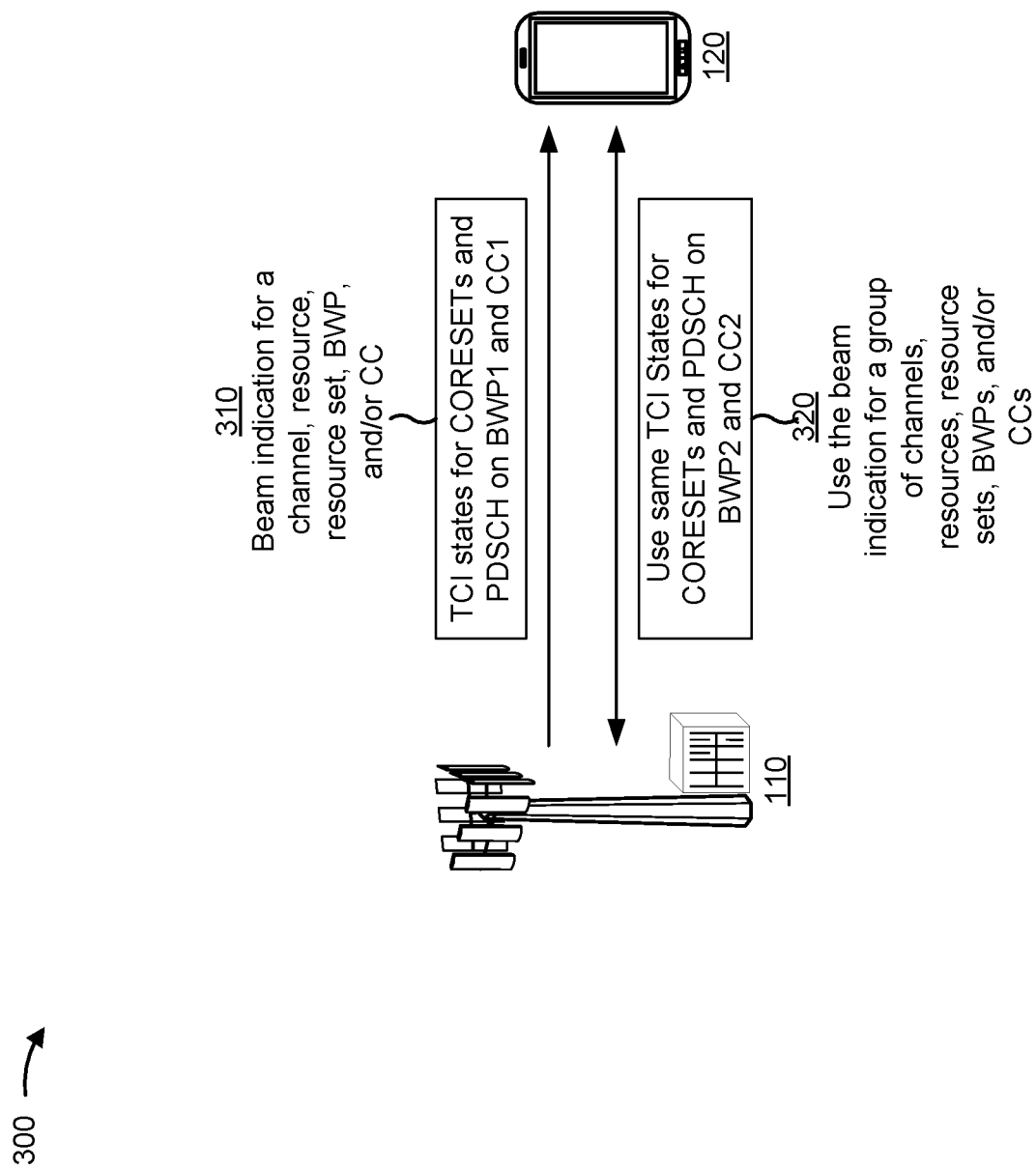
FIGS. 3-5 are diagrams illustrating examples of group-based beam indication and signaling, in accordance with various aspects of the present disclosure.

FIG. 3 is a diagram illustrating an example 300 of group-based beam indication and signaling, in accordance with various aspects of the present disclosure. A beam indication can include signaling, from one communication device to another, that is related to information about one or more communication beams. A beam indicator helps communication devices discern beam types, obtain information about communication beams, and utilize beams for appropriate or proper communications. A beam indicator can be used to differentiate one beam from another. Additionally, or alternatively, a beam indicator can be used to signal information about one or more beams during communication operations. A beam indicator may be configured as control or data in various deployment alternatives. A beam indicator may be considered beam metadata—data or information about one or more particular beams. Signaling of a beam indicator for a specific beam enables and provides granular information about the beam. By enabling one beam indicator to provide an indication status for a plurality of beams, signaling of one beam indicator (e.g., a single indicator) can be applied and shared across multiple resources/channels, thereby yielding efficient, quality communication.

A beam indicator can be signaled in a variety of manners. For example, in some cases, a beam indication may be separately signaled for different resources, different resource sets, different channels, different bandwidth parts (BWPs), different component carriers (CCs), and/or the like. A beam indication (or a beam indicator) may be used to signal various parameters, including a transmission configuration indication (TCI) state, a quasi-co location (QCL) relationship, a spatial relation, and/or the like. For example, for downlink communications, a separate set of TCI states (e.g., configured or activated TCI states) may be indicated by a base station 110 for different bandwidth parts. That is, the base station 110 may signal a first set of TCI states for a first bandwidth part, may signal a second set of TCI states for a second bandwidth part, and so on for each of the configured bandwidth parts. This allows for full flexibility in configuring TCI states for bandwidth parts.

Yet in some cases, the same set of TCI states may be indicated for different bandwidth parts (e.g., due to similarities in beam characteristics in a cell). In these cases, transmitting a first signal that indicates the first set of TCI states and transmitting a second signal that indicates the second set of TCI states wastes network resources used to carry the signals, wastes base station resources used to generate and transmit the signals (e.g., processing resources, memory resources, and/or the like), and wastes UE resources used to receive and process the signals (e.g., processing resources, memory resources, and/or the like) when the first set of TCI states and the second set of TCI states are the same.

Similarly, for uplink communications, a separate set of spatial relations (e.g., configured or activated spatial relations) may be indicated by a base station 110 for different physical uplink control channel (PUCCH) resources and/or different sounding reference signal (SRS) resources (referred to collectively as PUCCH/SRS resources). That is, the base station 110 may signal a first activated spatial relation for a first PUCCH/SRS resource, may signal a second activated spatial relation for a second PUCCH/SRS resource, and so on for each PUCCH/SRS resource. This allows for full flexibility in configuring spatial relations for bandwidth parts, but requires transmission of a separate signal, such as a separate media access control (MAC) control element (CE) (MAC-CE), for each PUCCH/SRS resource.

In some cases, the same activated spatial resource may be indicated for different PUCCH/SRS resources (e.g., when the UE 120 has a capability to support only a single active spatial relation). In these cases, transmitting a first signal that indicates the first activated spatial relation and transmitting a second signal that indicates the second activated spatial relation wastes network resources used to carry the signals, base station resources used to generate and transmit the signals, and UE resources used to receive and process the signals when the first activated spatial relation and the second activated spatial relation are the same.

Some techniques and apparatuses described herein enable communication devices to leverage a beam indicator across multiple resources and/or channels. For example, some aspects enable a base station 110 to transmit, and enable a UE 120 to receive, a beam indication that applies to a group or a logical group of parameters. A group of parameters can include multiple resources, multiple resource sets, a group of channels, multiple BWPs, multiple CCs, and/or the like. For example, a TCI state may be applied to multiple BWPs and/or multiple CCs, a spatial relation may be applied to multiple PUCCH resources, and/or the like, thereby conserving network resources, base station resources, and UE resources, as indicated above. Furthermore, some techniques and apparatuses described herein permit efficient and flexible signaling to indicate the resources, resource sets, channels, BWPs, and/or CCs to which a beam indication is to be applied. These techniques and apparatuses may conserve network resources by limiting the overhead needed for such signaling, while permitting flexibility in indicating the resources, resource sets, channels, BWPs, and/or CCs to which a beam indication is to be applied. Additional details are provided below.

As shown in FIG. 3, and by reference number 310, a base station 110 may transmit, and a UE 120 may receive, a beam indication. The beam indication may apply specifically to one or more communication elements, such as one or more of a channel, a resource, a resource set, a bandwidth part, and/or a component carrier. As shown by reference number 320, the UE 120 and the base station 110 may use a beam indication for a group of communication elements. This group of communication elements may include a group of channels, multiple resources, multiple resource sets, multiple bandwidth parts, or multiple component carriers. Thus, according to some particular, exemplary aspects, a single beam indication can be applied to multiple (e.g., a group of) communication elements, such as multiple (e.g., a group of) channels, resources, resource sets, bandwidth parts, and/or component carriers. This approach can conserve overhead as compared to signaling separate beam indications for different communication elements, such as different channels, resources, resource sets, bandwidth parts, and/or component carriers. In some aspects, a radio resource control (RRC) message may be used to configure a set of communication elements, such as a set of channels, resources, resource sets, bandwidth parts, and/or component carriers, and a MAC-CE and/or downlink control information (DCI) may be used to activate one or more communication elements, such as one or more channels, resources, resources sets, bandwidth parts, and/or component carriers from the configured sets.

Group-based beam indications may be used for a variety of parameters. In some aspects, the beam indication may indicate that a TCI state, a QCL relationship, and/or a spatial relation is to be activated for a first channel, a first resource, a first resource set, a first bandwidth part, and/or a first component carrier, and the UE 120 may use (e.g., activate, configure, transmit using, and/or the like) the TCI state, the QCL relationship, and/or the spatial relation not only for the first channel, the first resource, the first resource set, the first bandwidth part, and/or the first component carrier, but also for a second channel, a second resource, a second resource set, a second bandwidth part, and/or a second component carrier. Additionally, or alternatively, the UE 120 may use (e.g., activate, configure, transmit using, and/or the like) the TCI state, the QCL relationship, and/or the spatial relation for one or more other (e.g., a third, a fourth, and so on) channels, resources, resource sets, bandwidth parts, and/or component carriers.

For example, the base station 110 may transmit an indication of one or more beams (e.g., a single beam or multiple beams, which may be indicated using a TCI state, a QCL relationship, a spatial relation, and/or the like) that are to be configured and/or activated (e.g., indicated and/or stored in a configuration in memory of the UE 120, activated for use by the UE 120, and/or the like) for a first bandwidth part, and the UE 120 may configure and/or activate the one or more beams for the first bandwidth part and one or more other bandwidth parts (e.g., a second bandwidth part, a third bandwidth part, and so on). In some aspects, the one or more other bandwidth parts are not identified in the indication of the one or more beams that are to be configured and/or activated for the first bandwidth part.

Additionally, or alternatively, the base station 110 may transmit an indication of one or more beams that are to be configured and/or activated for a first CC, and the UE 120 may configure and/or activate the one or more beams for the first CC and one or more other CCs (e.g., a second CC, a third CC, and so on). In some aspects, the one or more other CCs are not identified in the indication of the one or more beams that are to be configured and/or activated for the first CC.

Additionally, or alternatively, the base station 110 may transmit an indication of one or more beams that are to be configured and/or activated for a first channel, and the UE 120 may configure and/or activate the one or more beams for the first channel and one or more other channels (e.g., a second channel, a third channel, and so on). In some aspects, the one or more other channels are not identified in the indication of the one or more beams that are to be configured and/or activated for the first channel. A channel may include, for example, a physical downlink control channel (PDCCH), a physical downlink shared channel (PDSCH), a physical uplink control channel (PUCCH), a physical uplink shared channel (PUSCH), and/or the like.

Additionally, or alternatively, the base station 110 may transmit an indication of one or more beams that are to be configured and/or activated for a first resource set (e.g., a set of CSI-RS/PUCCH/SRS resources), and the UE 120 may configure and/or activate the one or more beams for the first resource set and one or more other resource sets (e.g., a second resource set, a third resource set, and so on). In some aspects, the one or more other resource sets are not identified in the indication of the one or more beams that are to be configured and/or activated for the first resource set. Additionally, or alternatively, the base station 110 may transmit an indication of one or more beams that are to be configured and/or activated for a first resource (e.g., a CSI-RS/PUCCH/SRS resource), and the UE 120 may configure and/or activate the one or more beams for the first resource and one or more other resources (e.g., a second resource, a third resource, and so on). In some aspects, the one or more other resources are not identified in the indication of the one or more beams that are to be configured and/or activated for the first resource. In some aspects, the first resource and the second resource are in different configured resource sets.

In some aspects, the base station 110 may transmit an indication of one or more beams that are to be configured and/or activated for a first set of elements that includes two or more of a resource, a resource set, a channel, a BWP, or a CC, and the UE 120 may configure and/or activate the one or more beams for the first set of elements and one or more other sets of elements (e.g., a second set of elements, a third set of elements, and so on). In some aspects, the one or more other sets of elements are not identified in the indication of the one or more beams that are to be configured and/or activated for the first set of elements.

For example, in example 300, the base station 110 indicates a set of TCI states that are to be configured and/or activated for one or more control resource sets (CORESETs) and a PDSCH on a first bandwidth part (e.g., identified as BWP 1) and a first CC (e.g., identified as CC 1). The indication may identify BWP 1 and CC 1. In some aspects, the indication may not identify a second bandwidth part (e.g., BWP 2) and may not identify a second CC (e.g., CC 2). However, the UE 120 may use the indicated set of TCI states to not only configure and/or activate one or more TCI states for the CORESET(s) and the PDSCH on the first bandwidth part and the first CC, but to also configure and/or activate one or more TCI states for CORESET(s) and the PDSCH on a second bandwidth part and the second CC. In this way, network resources can be conserved by foregoing transmission of an indication to use the set of TCI states for the second bandwidth part and the second CC. Furthermore, base station resources that would otherwise be used to generate and transmit the indication can be conserved, and UE resources that would otherwise be used to receive and process the indication can be conserved.

In some aspects, the base station 110 may indicate a beam indication (e.g., a spatial relation) that is to be configured and/or activated for a first sounding reference signal (SRS) resource set on a first BWP (e.g., BWP 1) in a first CC (e.g., CC 1). The indication may identify BWP 1 and CC 1. In some aspects, the indication may not identify a second bandwidth part (e.g., BWP 2) and may not identify a second CC (e.g., CC 2). However, the UE 120 may use the beam indication for not only the first SRS resource set on the first BWP in the first CC, but also for a second SRS resource set on the second BWP in the second CC. In this way, network resources, base station resources, and/or UE resources may be conserved, as indicated above.

As indicated above, FIG. 3 is provided as an example. Other examples may differ from what is described with respect to FIG. 3.

Figure 4:
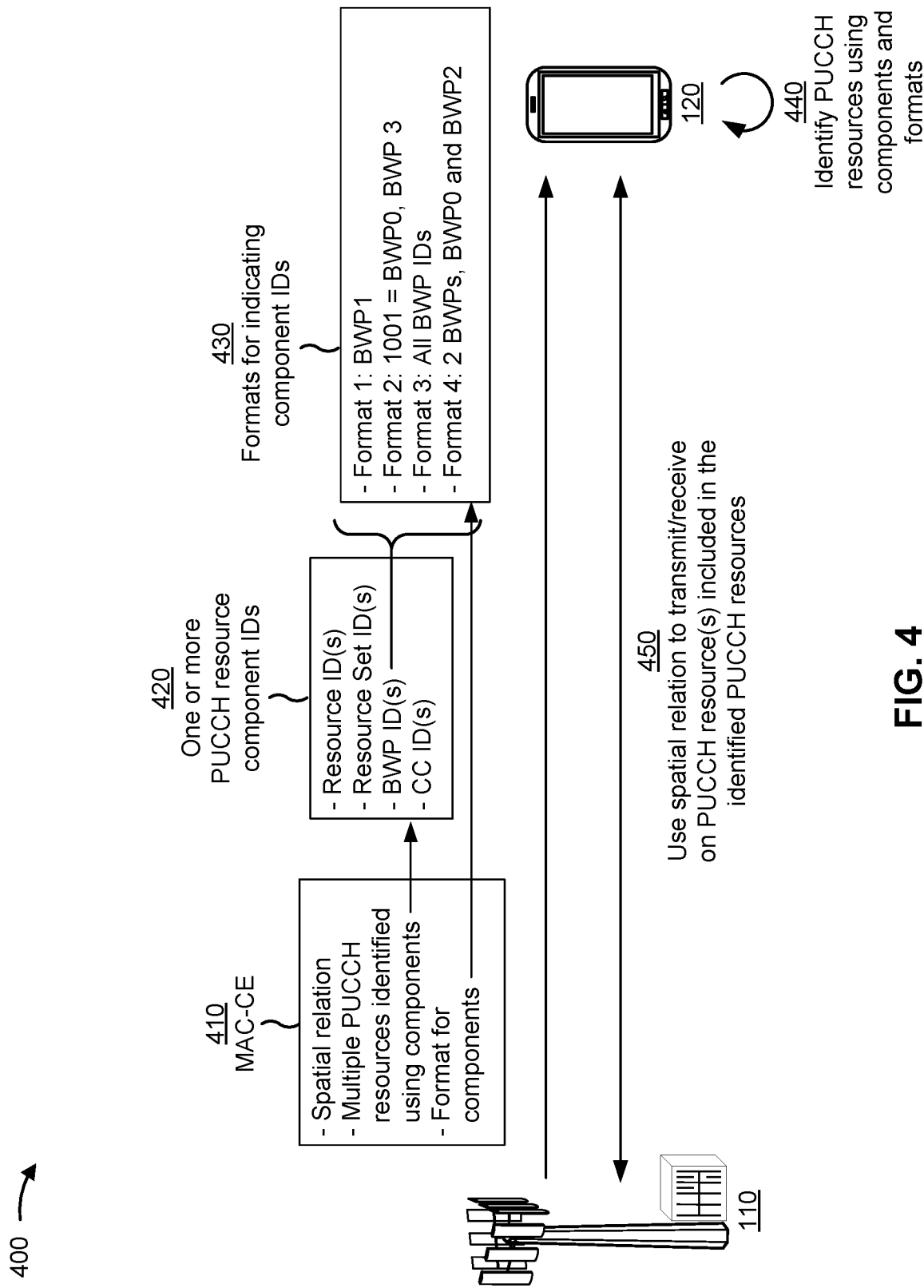

FIG. 4 is a diagram illustrating another example 400 of group-based beam indication and signaling, in accordance with various aspects of the present disclosure.

As shown by reference number 410, a base station 110 may transmit, and a UE 120 may receive, an indication of a spatial relation and multiple PUCCH resources to which the spatial relation is to be applied. The indication may be transmitted and/or received in a signaling message, such as a MAC-CE or the like. As further shown, in some aspects, the PUCCH resources may be indicated using one or more component types (sometimes referred to herein as PUCCH resource component types). Additionally, or alternatively, the signaling message may indicate a format for a component type or multiple formats corresponding to multiple component types. A format for a component type may be used to interpret a set of bits (e.g., one or more bits) used to indicate a component having the component type and/or to identify the PUCCH resources, as described in more detail below.

As shown by reference number 420, the signaling message may indicate the multiple PUCCH resources using one or more component identifiers (sometimes referred to as PUCCH resource component identifiers). A component identifier may include, for example, a PUCCH resource identifier (sometimes referred to as a resource identifier), a PUCCH resource set identifier (sometimes referred to as a resource set identifier), a bandwidth part identifier, and/or a component carrier identifier. The signaling message may include a single component identifier or any combination of multiple component identifiers. Similarly, a component type used to identify a PUCCH resource may include a PUCCH resource (e.g., a resource block, a time domain resource, a frequency domain resource, a time domain and frequency domain resource, and/or the like), a PUCCH resource set (e.g., a set of resource blocks, a set of time domain resources, a set of frequency domain resources, a set of time domain and frequency domain resources, and/or the like), a BWP, and/or a CC.

In some aspects, a single component identifier for a single component type may be used to identify the multiple PUCCH resources. For example, the signaling message may indicate a single CC identifier, and this may indicate that the UE 120 is to use the spatial relation for all PUCCH resources on the CC identified by the CC identifier (e.g., all communications transmitted using a PUCCH resource on the CC). In some aspects, multiple component identifiers may be used to identify the multiple PUCCH resources. For example, the signaling message may indicate a BWP and a CC, and the UE 120 may use the spatial relation for all PUCCH resources on the BWP and the CC.

As shown by reference number 430, a component identifier may be indicated using a format. In some aspects, the format may be fixed and/or prespecified (e.g., in a wireless telecommunication standard). In some aspects, the format may be relatively static, and may be indicated via a radio resource control (RRC) message. In some aspects, the format may be relatively dynamic. In some aspects, the format may be indicated in the signaling message, such as the MAC-CE, as shown in FIG. 4.

When a first format (e.g., format 1) is used for a component type, a component having that component type may be indicated in the signaling message using a single component identifier. For example, when the first format is used for the BWP component type, a BWP may be explicitly identified in the signaling message. In example 400, BWP 1 is explicitly indicated in the signaling message using the first format.

When a second format (e.g., format 2) is used for a component type, a component having that component type may be indicated in the signaling message using a bitmap with a bit corresponding to each configured and/or activated component having that component type. A first value of the bit (e.g., zero) may indicate that the spatial relation is not to be used for a component corresponding to the bit, and a second value of the bit (e.g., one) may indicate that the spatial relation is to be used for the component corresponding to the bit. For example, the base station 110 may configure the UE 120 with a first BWP (e.g., BWP 0), a second BWP (e.g., BWP 1), a third BWP (e.g., BWP 2), and a fourth BWP (e.g., BWP 3) (e.g., for a particular CC). In this case, a bitmap of 1001 may indicate that the spatial relation is to be used for BWP 0 and BWP 3, and that the spatial relation is not to be used for BWP 1 and BWP 2.

When a third format (e.g., format 3) is used for a component type, a component having that component type may be indicated in the signaling message using a validity indicator that indicates whether or not the spatial relation is to be used for all components having the component type. For example, a first value of the validity indicator (e.g., zero) for a component type may indicate that the spatial relation is not to be used for all (or is not to be used for any) components having the component type, and a second value of the validity indicator (e.g., one) may indicate that the spatial relation is to be used for all components having the component type. In some aspects, the validity indicator may be an explicit indication included in the signaling message (e.g., using a single bit for a single component type, a set of bits corresponding to a set of component types, and/or the like). In some aspects, the validity indicator may be an implicit indication. For example, if the signaling message does not include any component identifiers for a component type, then this may indicate that the spatial relation is to be applied to all components having the component type. In example 400, if a BWP or a set of BWPs is not explicitly identified in the signaling message, then this indicates that the spatial relation is to apply to all BWPs.

When a fourth format (e.g., format 4) is used for a component type, a component having that component type may be indicated in the signaling message using an explicit indication of multiple components having the component type. In this case, the signaling message may indicate a number of components, having the component type, that are identified in the signaling message, and may also include a corresponding number (e.g., the same number or quantity) of component identifiers to identify the components to which the spatial relation is to be applied. In example 400, when the fourth format is used for the BWP component type, the signaling message indicates that two BWP components are identified in the signaling message, and then identifies those two BWP components as BWP 0 and BWP 2. By indicating the number of components in the signaling message, the UE 120 may be capable of properly interpreting bits in the signaling message.

As shown by reference number 440, the UE 120 may identify the PUCCH resources indicated in the signaling message. For example, the UE 120 may use the indicated formats to interpret bits in the signaling message, where the bits indicate the components. The UE 120 may use the indicated components to identify the PUCCH resources to which the spatial relation, indicated in the signaling message, is to be applied. In some aspects, a single MAC-CE (e.g., identified using a single logic channel identifier (LCID) that uniquely identifies that MAC-CE) may indicate the spatial relation, the format to be used to interpret bits that indicate the components, and the components (e.g., using the bits interpreted according to the format). Additional details regarding the content of the MAC-CE are described below in connection with FIG. 5.

As an example, if the signaling message uses format 1 for a CC component type and does not indicate any other component types, then the signaling message may include a single CC identifier that identifies a CC. In this case, the UE 120 may apply the indicated spatial relation (e.g., a spatial relation activated by the MAC-CE) to all PUCCH resources on the CC.

As another example, if the signaling message uses format 1 for a resource set component type, uses format 1 for a BWP component type, and uses format 1 for a CC component type, then the signaling message may include a single resource set identifier that identifies a PUCCH resource set, may include a single BWP identifier that identifies a BWP, and may include a single CC identifier that identifies a CC. In this case, the UE 120 may apply the indicated spatial relation to all PUCCH resources in the indicated PUCCH resource set on the indicated BWP and CC.

As another example, if the signaling message uses format 2 for a PUCCH resource component type, uses format 1 for a BWP component type, and uses format 1 for a CC component type, then the signaling message may include a bitmap to identify PUCCH resources, may include a single BWP identifier that identifies a BWP, and may include a single CC identifier that identifies a CC. In this case, the UE 120 may apply the indicated spatial relation to the PUCCH resources that are indicated in the bitmap and that are on the indicated BWP and CC. For example, bits with a value of 1 may indicate that the spatial relation is to be used for PUCCH resources corresponding to those bits.

As shown by reference number 450, the UE 120 may use the spatial relation, identified in the signaling message, to transmit communication(s) on one or more PUCCH resources included in the multiple PUCCH resources indicated in the signaling message. Similarly, the base station 110 may use the spatial relation, identified in the signaling message, to receive communication(s) on one or more PUCCH resources included in the multiple PUCCH resources indicated in the signaling message.

For example, the UE 120 may determine that a PUCCH resource, on which a communication is scheduled and/or is to be transmitted, is included in the PUCCH resources indicated in the signaling message. Based at least in part on this determination, the UE 120 may transmit the communication on the PUCCH resource using the spatial relation indicated in the signaling message. In this way, spatial relations may be flexibly configured while conserving network resources, base station resources, and/or UE resources, as described elsewhere herein.

As indicated above, FIG. 4 is provided as an example. Other examples may differ from what is described with respect to FIG. 4.

Figure 5:
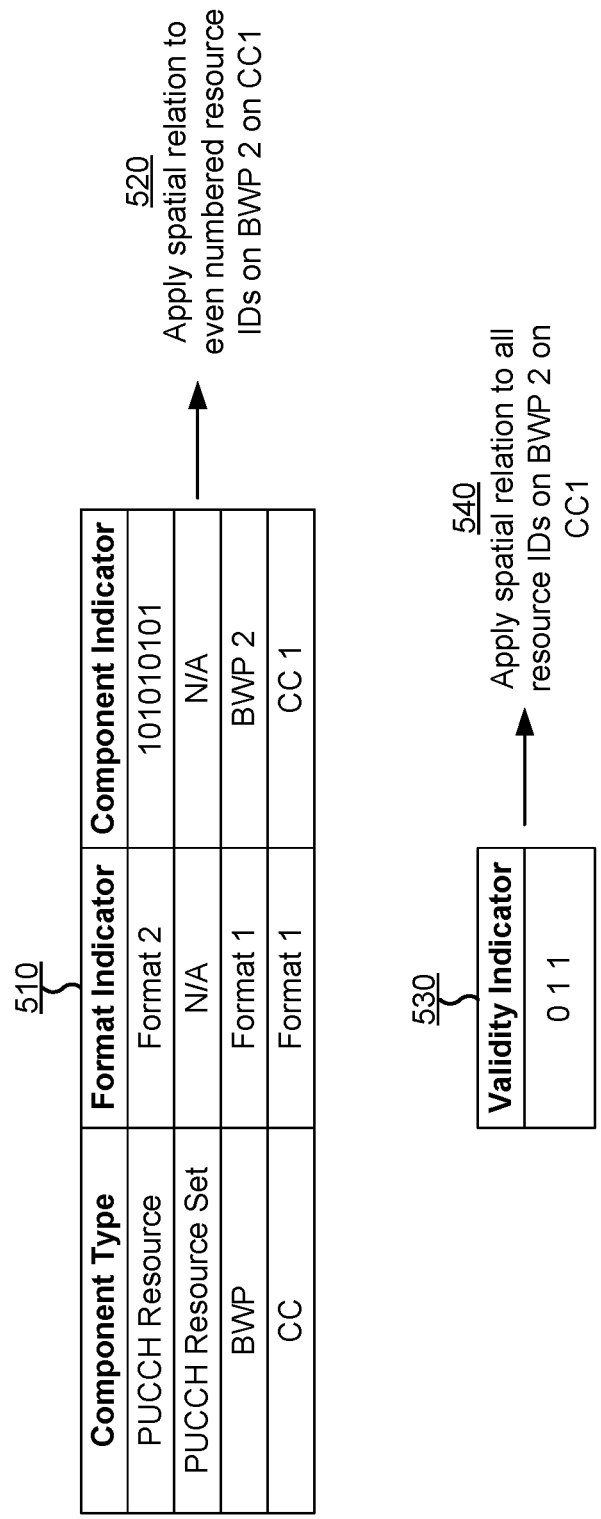

FIG. 5 is a diagram illustrating an example 500 of group-based beam indication and signaling, in accordance with various aspects of the present disclosure.

FIG. 5 shows an example of contents of a signaling message, such as a MAC-CE, that indicate a set of components and a set of formats to be used to interpret bits that indicate the set of components. As shown by reference number 510, the signaling message may include a format indicator and a component indicator for one or more component types. The component types are shown as a PUCCH resource component type, a PUCCH resource set component type, a BWP component type, and a CC component type. The signaling message may indicate sets of components corresponding to any combination of component types. In some aspects, the signaling message may indicate one or more components for only a single component type. In example 500, the signaling message indicates components for a PUCCH resource component type, a BWP component type, and a CC component type, and not a PUCCH resource set component type. However, other combinations may be different from what is shown in FIG. 5.

As shown, the signaling message may indicate that format 2 is used to indicate one or more PUCCH resources having the PUCCH resource component type, that format 1 is used to indicate a single BWP, and that format 1 is used to indicate a single CC. In this case, the single BWP is explicitly identified as BWP 2, the single CC is explicitly identified as CC 1, and the PUCCH resources are indicated using a bitmap of 101010101, which indicates even-numbered PUCCH resources (e.g., PUCCH resource ID 0, PUCCH resource ID 2, PUCCH resource ID 4, PUCCH resource ID 6, and PUCCH resource ID 8). In this case, as shown by reference number 520, the UE 120 may apply a spatial relation, indicated in the signaling message, to the PUCCH resources indicated in the bitmap on BWP 2 on CC 1.

In some aspects, the MAC-CE may be designed with a fixed size such that the base station 110 is capable of using the MAC-CE to indicate only a single combination of formats for corresponding component types. In example 500, this single combination is format 2 for the PUCCH resource component type, format 1 for the BWP component type, and format 1 for the CC component type. In this case, the MAC-CE may have a fixed size (e.g., a fixed length), which may simplify processing and/or generation of the MAC-CE and thereby conserve UE resources and base station resources.

In some aspects, the MAC-CE may be designed with a fixed size such that the base station 110 is capable of using the MAC-CE to indicate multiple combinations of formats for corresponding component types. For example, as shown by reference number 530, the MAC-CE may include a validity indicator. The validity indicator may indicate whether to use the component indicator in the signaling message to identify the components for a component type (e.g., when the validity indicator for the component type has a first value, such as one) or whether to apply the spatial relation to all components (e.g., configured components) having the component type (e.g., when the validity indicator for the component type has a second value, such as zero). In example 500, the validity indicator is shown as a bitmap of 011, with the first bit (zero) corresponding to the PUCCH resource component type, the second bit (one) corresponding to the BWP component type, and the third bit (one) corresponding to the CC component type. In this case, the UE 120 uses the component indicator to identify the BWP and the CC, and ignores the component indicator for the PUCCH resource. Thus, as shown by reference number 540, the UE 120 applies the spatial relation, indicated in the signaling message, to all PUCCH resources on BWP 2 on CC 1.

In some aspects, the validity indicator may be included in a body of the MAC-CE to indicate which component indicators are valid (e.g., are to be used to identify the components to which the spatial relation is to be applied) and which component indicators are invalid (e.g., are not to be used to identify the components to which the spatial relation is to be applied). In some aspects, the validity indicator may be included in a sub-header of the MAC-CE and/or in a length field of the MAC-CE. In this case, the MAC-CE may have a variable length.

As indicated above, FIG. 5 is provided as an example. Other examples may differ from what is described with respect to FIG. 5.

Figure 6:
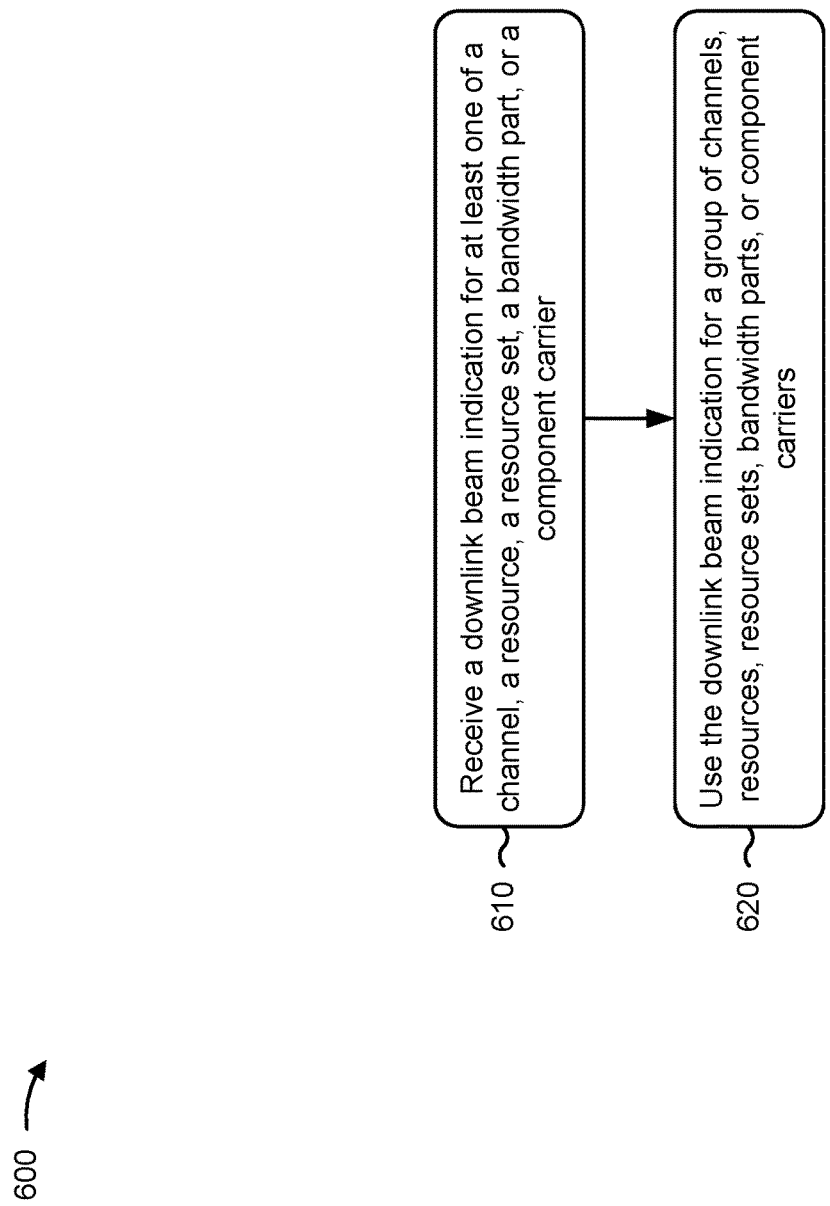
FIGS. 6-7 are diagrams illustrating example processes relating to group-based beam indication and signaling, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with group-based beam indication and signaling.

As shown in FIG. 6, in some aspects, process 600 may include receiving a downlink beam indication for at least one of a channel, a resource, a resource set, a bandwidth part, or a component carrier (block 610). For example, the UE (e.g., using receive processor 258, controller/processor 280, memory 282, and/or the like) may receive a downlink beam indication for at least one of a channel, a resource, a resource set, a bandwidth part, or a component carrier, as described above.

As further shown in FIG. 6, in some aspects, process 600 may include using the downlink beam indication for a group of channels, resources, resource sets, bandwidth parts, or component carriers (block 620). For example, the UE (e.g., using receive processor 258, transmit processor 264, controller/processor 280, memory 282, and/or the like) may use the downlink beam indication for a group of channels, resources, resource sets, bandwidth parts, or component carriers, as described above.

Process 600 may include additional aspects, such as any single implementation or any combination of aspects described below and/or in connection with one or more other processes described elsewhere herein.

In a first aspect, the downlink beam indication includes at least one of a transmission configuration indicator (TCI) state or a quasi co-location (QCL) relationship. In a second aspect, alone or in combination with the first aspect, the downlink beam indication is received for a first physical downlink shared channel (PDSCH) and for at least one of a first bandwidth part or a first component carrier, and the downlink beam indication is used for a second PDSCH and for at least one of a second bandwidth part or a second component carrier. In a third aspect, alone or in combination with one or more of the first and second aspects, the downlink beam indication is received for a first control resource set (CORESET) and a first physical downlink shared channel (PDSCH) on a first bandwidth part or a first component carrier and is used for a second CORESET and a second PDSCH on a second bandwidth part or a second component carrier.

In a fourth aspect, alone or in combination with one or more of the first through third aspects, the downlink beam indication is received for a first control resource set (CORESET) and for at least one of a first bandwidth part or a first component carrier, and the downlink beam indication is used for a second CORESET on at least one of a second bandwidth part or a second component carrier. In a fifth aspect, alone or in combination with one or more of the first through fourth aspects, the beam indication is stored in a configuration or activated for use.

Although aspects are described above in connection with a downlink beam indication, similar operations may be performed for an uplink beam indication. For example, the UE may receive an uplink beam for at least one of a channel, a resource, a resource set, a bandwidth part, or a component carrier; and may use the uplink beam indication for a group of channels, resources, resource sets, bandwidth parts, or component carriers. In one aspect, alone or in combination with one or more aspects described elsewhere herein, a single activated and/or configured beam indication used on a particular uplink and/or downlink channel or resource on a bandwidth part and/or a component carrier can be applied to a group of channels, resources, resource sets, bandwidth parts, and/or component carriers.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
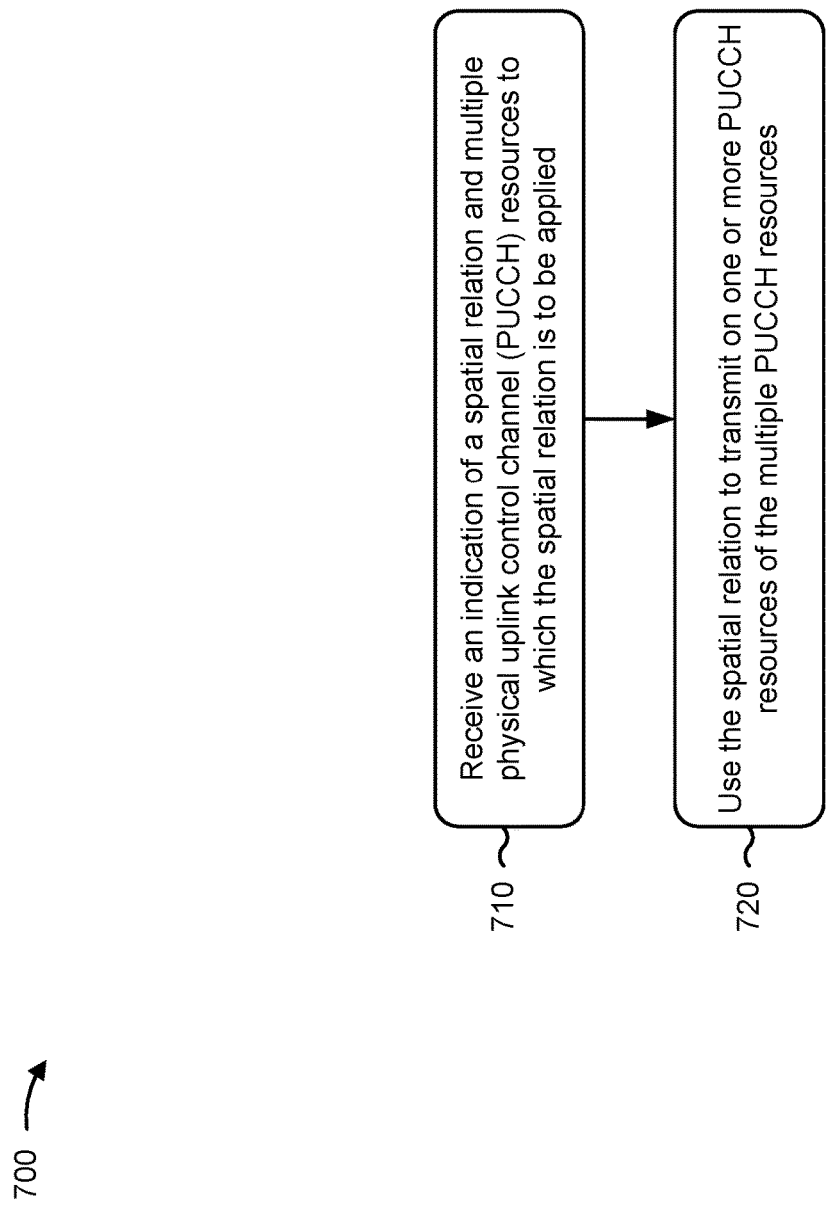

FIG. 7 is a diagram illustrating an example process 700 performed, for example, by a UE, in accordance with various aspects of the present disclosure. Example process 700 is an example where a UE (e.g., UE 120 and/or the like) performs operations associated with group-based beam indication and signaling.

As shown in FIG. 7, in some aspects, process 700 may include receiving an indication of a spatial relation and multiple physical uplink control channel (PUCCH) resources to which the spatial relation is to be applied (block 710). For example, the UE (e.g., using receive processor 258, transmit processor 264, controller/processor 280, memory 282, and/or the like) may receive an indication of a spatial relation and multiple physical uplink control channel (PUCCH) resources to which the spatial relation is to be applied, as described above.

As further shown in FIG. 7, in some aspects, process 700 may include using the spatial relation to transmit on one or more PUCCH resources of the multiple PUCCH resources (block 720). For example, the UE (e.g., using receive processor 258, transmit processor 264, controller/processor 280, memory 282, and/or the like) may use the spatial relation to transmit on one or more PUCCH resources of the multiple PUCCH resources, as described above.

Process 700 may include additional aspects, such as any single implementation or any combination of aspects described below and/or in connection with one or more other processes described elsewhere herein.

In a first aspect, the multiple PUCCH resources are indicated using one or more component identifiers that include at least one of a PUCCH resource identifier, a PUCCH resource set identifier, a bandwidth part identifier, a component carrier identifier, or a combination thereof. In a second aspect, alone or in combination with the first aspect, a component identifier, of the one or more component identifiers, is indicated using one of: a first format that explicitly indicates a single component identifier for a component, a second format that includes a bitmap that indicates the component identifier from a set of configured component identifiers, a third format that indicates all component identifiers for a component, or a fourth format that indicates a number of component identifiers and a corresponding component identifier for each of the number of component identifiers.

In a third aspect, alone or in combination with one or more of the first and second aspects, a format to be used to indicate a component identifier, of the one or more component identifiers, is signaled to the UE. In a fourth aspect, alone or in combination with one or more of the first through third aspects, the indication is received in a single media access control (MAC) control element (MAC-CE).

In a fifth aspect, alone or in combination with one or more of the first through fourth aspects, a single MAC-CE is used to indicate the spatial relation, the multiple PUCCH resources, and a set of formats for interpreting a set of bits used to indicate a set of components that indicate the multiple PUCCH resources. In a sixth aspect, alone or in combination with one or more of the first through fifth aspects, the set of components is explicitly indicated by the set of formats. In a seventh aspect, alone or in combination with one or more of the first through sixth aspects, the single MAC-CE has a fixed length. In an eighth aspect, alone or in combination with one or more of the first through seventh aspects, the set of components is indicated by the set of formats and a validity indicator that indicates whether a format, of the set of formats, is to be used to identify a corresponding component or whether all component identifiers for the component are to be used to identify PUCCH resources. In a ninth aspect, alone or in combination with one or more of the first through eighth aspects, the single MAC-CE has a fixed length and the validity indicator is included in a body of the MAC-CE. In a tenth aspect, alone or in combination with one or more of the first through ninth aspects, the single MAC-CE has a variable length and the validity indicator is included in a sub-header of the MAC-CE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink beam indication for at least one of a bandwidth part or a component carrier; and
   using the downlink beam indication for a group of bandwidth parts or component carriers,
   wherein the group of bandwidth parts or component carriers includes at least one of a different bandwidth part than the bandwidth part or a different component carrier than the component carrier.

2. The method of claim 1, wherein the downlink beam indication includes at least one of a transmission configuration indicator (TCI) state or a quasi co-location (QCL) relationship.

3. The method of claim 2, wherein the downlink beam indication is received for a first physical downlink shared channel (PDSCH) and for at least one of a first bandwidth part or a first component carrier, and wherein the downlink beam indication is used for a second PDSCH and for at least one of a second bandwidth part or a second component carrier.

4. The method of claim 1, wherein the downlink beam indication is received for a first control resource set (CORESET) and for at least one of a first bandwidth part or a first component carrier, and wherein the downlink beam indication is used for a second CORESET on at least one of a second bandwidth part or a second component carrier.

5. The method of claim 1, wherein the downlink beam indication is stored in a configuration or activated for use.

6. A method of wireless communication performed by a user equipment (UE), comprising:
   receiving an indication of a spatial relation and multiple physical uplink control channel (PUCCH) resources to which the spatial relation is to be applied,
   wherein the indication indicates the multiple PUCCH resources using at least one of a bandwidth part identifier or a component carrier identifier; and
   using the spatial relation to transmit on one or more PUCCH resources of the multiple PUCCH resources.

7. The method of claim 6, wherein the multiple PUCCH resources are indicated using component identifiers that include:
   a PUCCH resource identifier,
   the bandwidth part identifier, and
   the component carrier identifier.

8. The method of claim 7, wherein a component identifier, of the component identifiers, is indicated using one of:
   a first format that explicitly indicates a single component identifier for a component,
   a second format that includes a bitmap that indicates the component identifier from a set of configured component identifiers,
   a third format that indicates all component identifiers for a component, or a fourth format that indicates a number of component identifiers and a corresponding component identifier for each of the number of component identifiers.

9. The method of claim 7, wherein a format to be used to indicate a component identifier, of the component identifiers, is signaled to the UE.

10. The method of claim 6, wherein the indication is received in a single media access control (MAC) control element (MAC-CE).

11. The method of claim 10, wherein the single MAC-CE has a variable length.

12. The method of claim 6, wherein the indication indicates the multiple PUCCH resources using the bandwidth part identifier.

13. The method of claim 6, wherein a single MAC-CE is used to indicate the spatial relation, the multiple PUCCH resources, and a set of formats for interpreting a set of bits used to indicate a set of components that indicate the multiple PUCCH resources.

14. The method of claim 13, wherein the set of components is indicated by the set of formats and a validity indicator that indicates whether a format, of the set of formats, is to be used to identify a corresponding component or whether all component identifiers for the component are to be used to identify PUCCH resources.

15. The method of claim 14, wherein the single MAC-CE has a fixed length and the validity indicator is included in a body of the MAC-CE.

16. The method of claim 13, wherein the set of components is explicitly indicated by the set of formats.

17. The method of claim 16, wherein the single MAC-CE has a fixed length.

18. The method of claim 6, wherein the indication indicates the multiple PUCCH resources using the component carrier identifier.

19. A user equipment (UE) for wireless communication, comprising:
 a memory; and
 one or more processors operatively coupled to the memory, the memory and the one or more processors configured to:
  receive a downlink beam indication for at least one of a bandwidth part or a component carrier; and
  use the downlink beam indication for a group of bandwidth parts or component carriers,
   wherein the group of bandwidth parts or component carriers includes at least one of a different bandwidth part than the bandwidth part or a different component carrier than the component carrier.

20. The UE of claim 19, wherein the downlink beam indication is received for a first control resource set (CORESET) and for at least one of a first bandwidth part or a first component carrier, and wherein the downlink beam indication is used for a second CORESET on at least one of a second bandwidth part or a second component carrier.

21. The UE of claim 19, wherein the downlink beam indication is stored in a configuration or activated for use.

22. The UE of claim 19, wherein the downlink beam indication includes at least one of a transmission configuration indicator (TCI) state or a quasi co-location (QCL) relationship.

23. The UE of claim 22, wherein the downlink beam indication is received for a first physical downlink shared channel (PDSCH) and for at least one of a first bandwidth part or a first component carrier, and wherein the downlink beam indication is used for a second PDSCH and for at least one of a second bandwidth part or a second component carrier.

24. A user equipment (UE) for wireless communication, comprising:
 a memory; and
 one or more processors operatively coupled to the memory, the memory and the one or more processors configured to:
  receive an indication of a spatial relation and multiple physical uplink control channel (PUCCH) resources to which the spatial relation is to be applied,
   wherein the indication indicates the multiple PUCCH resources using at least one of a bandwidth part identifier or a component carrier identifier; and
  use the spatial relation to transmit on one or more PUCCH resources of the multiple PUCCH resources.

25. The UE of claim 24, wherein the indication is received in a single media access control (MAC) control element (MAC-CE).

26. The UE of claim 24, wherein a single MAC-CE is used to indicate the spatial relation, the multiple PUCCH resources, and a set of formats for interpreting a set of bits used to indicate a set of components that indicate the multiple PUCCH resources.

27. The UE of claim 26, wherein the set of components is indicated by the set of formats and a validity indicator that indicates whether a format, of the set of formats, is to be used to identify a corresponding component or whether all component identifiers for the component are to be used to identify PUCCH resources.

28. The UE of claim 26, wherein the set of components is explicitly indicated by the set of formats.

29. The UE of claim 28, wherein the single MAC-CE has a fixed length.

30. The UE of claim 24, wherein the multiple PUCCH resources are indicated using component identifiers that include:
 a PUCCH resource identifier,
 the bandwidth part identifier, and
 the component carrier identifier.

31. The UE of claim 30, wherein a component identifier, of the component identifiers, is indicated using one of:
 a first format that explicitly indicates a single component identifier for a component,
 a second format that includes a bitmap that indicates the component identifier from a set of configured component identifiers,
 a third format that indicates all component identifiers for a component, or
 a fourth format that indicates a number of component identifiers and a corresponding component identifier for each of the number of component identifiers.

32. The UE of claim 30, wherein a format to be used to indicate a component identifier, of the component identifiers, is signaled to the UE.

33. A method of wireless communication performed by a user equipment (UE), comprising:
 receiving a downlink beam indication for at least one of a bandwidth part or a component carrier,
  wherein the downlink beam indication includes at least one of a transmission configuration indicator (TCI) state or a quasi co-location (QCL) relationship; and
 using the downlink beam indication for a group of bandwidth parts or component carriers, wherein the downlink beam indication is received for a first physical downlink shared channel (PDSCH) and for at least one of a first bandwidth part or a first component carrier, and wherein the downlink beam indication is used for a second PDSCH and for at least one of a second bandwidth part or a second component carrier.

* * * * *